(12) United States Patent
O'Donnell et al.

(10) Patent No.: US 6,327,703 B1
(45) Date of Patent: Dec. 4, 2001

(54) VARIABLE SYMBOLIC LINKS FOR A FILE IN UNIX OPERATING SYSTEM

(75) Inventors: Michael D. O'Donnell; Danny B. Gross; Brian L. Borgeson, all of Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/258,763

(22) Filed: Feb. 26, 1999

(51) Int. Cl.[7] ........................................................ G06F 9/45
(52) U.S. Cl. ........................................ 717/5; 717/4; 717/6
(58) Field of Search ...................... 717/5, 7, 4, 6; 703/10, 23, 25; 704/1; 707/1

(56) References Cited

U.S. PATENT DOCUMENTS

| | | | |
|---|---|---|---|
| 5,193,191 | * 3/1993 | McKeeman et al. | 717/5 |
| 5,313,616 | * 5/1994 | Cline et al. | 717/4 |
| 5,339,433 | * 8/1994 | Frid-Nelsen | 717/5 |
| 5,388,257 | * 2/1995 | Bauer | 707/1 |
| 5,412,808 | * 5/1995 | Bauer | 707/1 |
| 5,574,898 | * 11/1996 | Leblang et al. | 707/1 |
| 5,832,527 | * 11/1998 | Kawaguchi | 707/205 |
| 5,848,274 | * 12/1998 | Hamby et al. | 717/5 |
| 5,905,990 | * 5/1999 | Inglett | 707/200 |
| 5,958,049 | * 9/1999 | Mealey et al. | 713/1 |
| 5,991,763 | * 11/1999 | Long et al. | 707/101 |
| 5,991,860 | * 11/1999 | Gross et al. | 711/173 |
| 6,006,018 | * 12/1999 | Burnett et al. | 709/219 |
| 6,047,332 | * 4/2000 | Viswanathan et al. | 709/245 |
| 6,119,212 | * 8/2000 | Gross et al. | 711/173 |
| 6,195,650 | * 2/2001 | Gaither et al. | 707/1 |

OTHER PUBLICATIONS

Ford et al, "The Flux OSKIT a substrate for kerenl and language research", SOSP CM pp. 38–51, May 1997.*
Srivastva et al, "Link time optimization of address claculation on a 64 bit architecture", SIGPLAN ACM, pp. 49–60, Jun. 1994.*
Joyce et al, "Linking BDD based symbolic evaluation to interactive theorem proving", ACM/IEEE Design Automation Conf. pp. 469–474, Jan. 1993.*
Law et al., "A node addition model for symbolic factorizaton", ACM Trans. on Math. Software, vol. 12, No. 1. pp. 37–50, Mar. 1986.*
Ramsey, "Relocating machine instructions by currying", PLDI ACM pp. 226–236, Feb. 1996.*
Gopal et al, "Integrating content based access mechanism with hierarchical file systems", OSDI USENIX Asso. pp. 265–278, 1999.*
Dean, "The Security of static typing with dynamic linking", CCS ACM pp. 18–27, Feb. 1997.*

* cited by examiner

*Primary Examiner*—Mark R. Powell
*Assistant Examiner*—Anil Khatri
(74) *Attorney, Agent, or Firm*—Williams, Morgan & Amerson, P.C.

(57) ABSTRACT

The invention is a method and apparatus for linking to a file in an operating system. In one aspect, the method includes defining a virtual variable; creating a variable symbolic link referencing a file using the virtual variable; referencing the file by the virtual variable; and expanding the virtual variable to identify the referenced file. In another aspect, the apparatus includes a computer-readable, program storage device encoded with instructions that, when executed by a computer, perform a method in accordance with the invention. In yet another aspect, the apparatus includes a computer programmed to perform a method in accordance with the invention.

33 Claims, 2 Drawing Sheets

VARIABLE SYMBOLIC LINKS FOR A FILE IN UNIX OPERATING SYSTEM

BACKGROUND OF THE INVENTION

1. Field of the Invention

This invention is generally directed to programming in a UNIX operating system and, more particularly, to the creation of links in such an operating system.

2. Description of the Related Art

Computers generally perform their most basic functions in accordance with their "operating system." An operating system is a program that runs other programs known as "applications programs," such as a word processor, invoked by the computer's user. The operating system also performs the elementary tasks associated with the computer's use, such as receiving input from the keyboard, sending output to a display or a printer, and controlling peripherals such as disk drives and printers. In some computers, the operating system might perform advanced tasks, such as maintaining security. Exemplary operating systems currently used include Windows® (a trademark of Microsoft Corp.), the Microsoft Disk Operating System (MS-DOS®) (a trademark of Microsoft Corp.), OS/2® (a trademark of IBM.), Linux® (a trademark of William R. Della Croce, Jr.), and UNIX® (a trademark of UNIXSYSTEM LABORATORIES, INC.).

UNIX is one popular operating system. The UNIX operating system is a "layered" operating system, and may be conceptualized as a plurality of concentric rings. The innermost ring, or the core, is the computer's hardware that physically executes the instructions of the software that comprises the two outer rings or layers. The outermost rings are called the "kernel" and the "shell," respectively. Applications programs are invoked and executed in the shell, or outermost ring, and the kernel controls the hardware, i.e., the innermost ring, to implement the instructions given by applications programs executing in the shell.

The kernel can be viewed as the "interface" between the applications programs and the hardware such that the applications programs in the shell never deal directly with the hardware. The kernel and the applications programs communicate through "system calls," which are requests by the applications programs for the kernel to perform specified services. Exemplary services that might be provided through system calls include accessing a file; manipulating a file by opening, closing, reading from, writing to, linking to, or executing the file; moving a file; enabling access to hardware devices; and managing system resources. However, there are many other types of system calls.

The kernel generally tracks files using "i-nodes." Each file has an i-node containing information about that file. For instance, the i-node may specify the ownership, creation date, last access date, last modification date, permissions, and the physical locations of the data blocks for the associated file. The kernel can then ascertain certain necessary or important information about the file in the performance of system calls.

Many system calls require one or more "links" to a file. A link is a pointer to a file. Links make it possible to reference a file by several different names and to access a file without specifying a full path for the file's location. Hard links allow two different files to show the same i-node and, hence, the same set of data blocks. Symbolic links may be conceptualized as two different files. One file contains the real data while the link itself is just a file containing the name of the real data file.

As an illustration, consider the output below generated by executing the command ls-li. The ls command is the system call for the kernel to list the contents of a directory. The suffix -li specifies that the -l and -i options for the ls command are to be implemented. These options specify an output of a 'long' listing including the i-node number for the file. This command is being executed on a computer system named 'pro', short for "production". The output might look something like this:

| 1872396 | -rwxr-xr-x | 2 user | nuucp | 436 | Oct 20 13:43 | HardLink |
|---|---|---|---|---|---|---|
| 1872396 | -rw-r-xr-x | 2 user | nuucp | 436 | Oct 20 13:42 | RealFile.PRO |
| 1872397 | lrwxr-xr-x | 1 user | nuucp | 15 | Oct 20 13:43 | SymbolicLink@ ->RealFile.PRO |

Each line of output corresponds to a file and includes, from left to right, the i-node, permissions, number of links, creator (i.e., user nuucp), size, creation date, and name for the file. The output also provides information on links to the files listed as is discussed below.

The above example shows an output for each of three files. The file named RealFile. PRO is a file that a user created using a text editor and is a standard UNIX file. The file named HardLink is a "hard" link to the file RealFile.PRO, evidenced in that the i-node number (column 1) is the same for both files. Also, the link count (in column three) is 2, indicating that there are two files in this file system that are referencing the same i-node number. The file named SymbolicLink is a link to the file named RealFile.PRO. Notice that the first letter in the second column is an l, which stands for link. Notice also that column six is the file size which in this case is 15 bytes. If one were able to look at the real contents of this file, it would be RealFile.PRO. However since the kernel knows this is a symbolic link, it treats the contents of the file as the name of the 'real' file to access. The name of the link and the name of the real file can be entirely different.

There are differing limitations and advantages to hard links and symbolic links. First, for a hard link, the two file names must be in the same file system. Second, a directory may not be the target of a hard link. However there are two advantages to hard links as well. The data contained within the two files is identical and will stay identical. Also, no extra disk space is occupied since the two file names actually reference the same data blocks. There are advantages and disadvantages to symbolic links as well. Symbolic links can cross file system boundaries. Symbolic links can point to directories. Symbolic links require only an i-node entry and do not occupy any real data blocks. However symbolic links can also be misconfigured and set to point to a non-existent file.

The present invention is directed to the resolution of one or more of the problems set forth above.

SUMMARY OF THE INVENTION

The invention is a method and apparatus for linking to a file in a UNIX operating system. In one aspect, the method comprises defining a virtual variable; creating a variable symbolic link referencing a file using the virtual variable; referencing the file by the virtual variable; and expanding the virtual variable to identify the referenced file. In another aspect, the apparatus includes a computer-readable, program storage device encoded with instructions that, when executed by a computer, perform a method in accordance with the invention. In yet another aspect, the apparatus includes a computer programmed to perform a method in accordance with the invention.

BRIEF DESCRIPTION OF THE DRAWINGS

The invention may be understood by reference to the following description taken in conjunction with the accompanying drawings, in which like reference numerals identify like elements, and in which.

Figure 1:
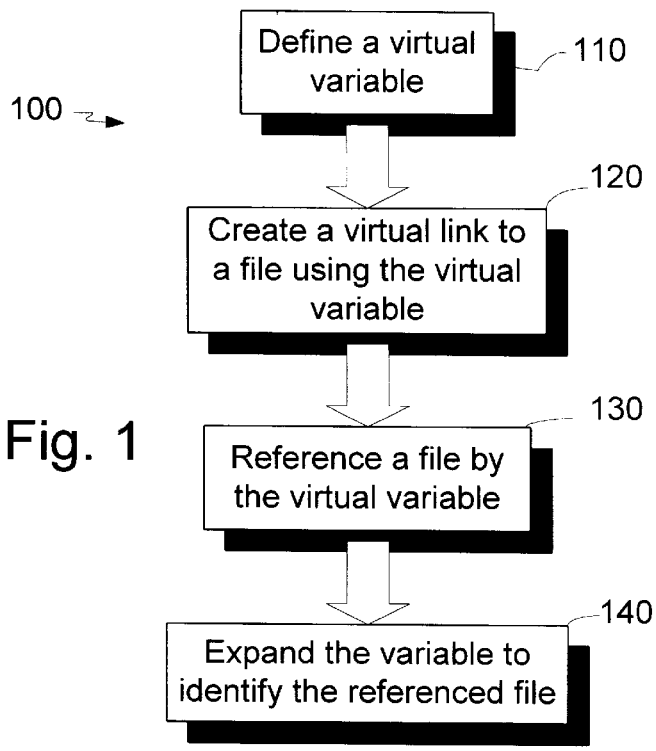
FIG. 1 illustrates a method practiced in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The invention, in a first aspect, is a method for linking to a file in a UNIX operating system. FIG. 1 illustrates one particular embodiment 100 of such a method. The method 100 proceeds by first defining a "virtual variable" as set forth in the box 110. The method 100 next, as set forth in the box 120, creates a variable symbolic link referencing a file using the virtual variable. Next, the method 100 references the file by the virtual variable as set forth in the box 130. Finally, the method 100 expands the variable to identify the referenced file as set forth in the box 140.

Figure 2:
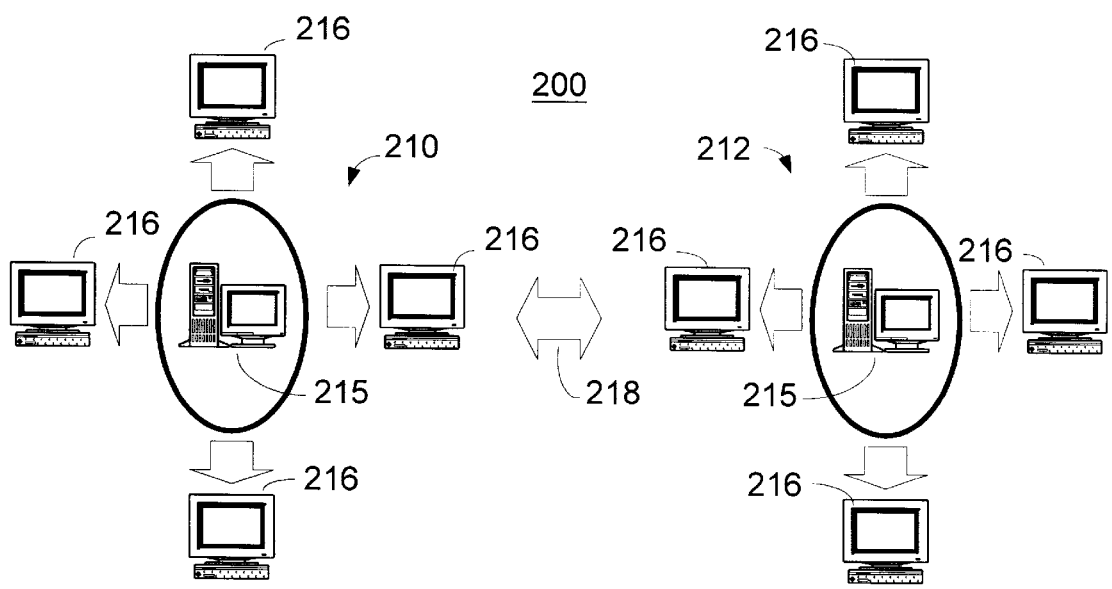
FIG. 2 depicts two computers systems with which the method of FIG. 1 may be employed.

To further an understanding of and to illustrate the power and utility of the present invention, the implementation of the method 100 in a particular context will be disclosed. The particular implementation is shown in FIG. 2. However, the invention is not so limited as the method 100 may be implemented in other contexts as discussed more fully below. It is therefore to be understood that the following discussion of the method 100 is intended solely to illustrate one such implementation in order to clarify and promote a fuller appreciation of the present invention.

FIG. 2 illustrates an implementation 200 comprising a pair of computer systems 210 and 212. The computer system 210 is intended for developing software to be implemented on other computer systems, such as the computer system 212. The computer system 212, in this embodiment, is used in the commercial production of a commodity. It is therefore undesirable to halt the operation of the computer system 212 because doing so halts production. Software to be installed on the computer system 212 consequently is first developed on the computer system 210 before installation on the computer system 212. The computer systems 210 and 212 are therefore hereafter referred to as the "development" system 210 and the "production" system 212.

The production system 212 is the same as the development system 210 in most significant respects. In fact, in the particular embodiment 200 illustrated, the computer system 212 is "cloned" from the computer system 210. The technique by which this is accomplished is disclosed in our application Ser. No. 09/247,358, entitled "Method and Apparatus for Cloning Computer Systems," filed Feb. 10, 1999, which is hereby incorporated by reference in its entirety for all purposes. FIG. 2 depicts each of the systems 210 and 212 in a conceptualized fashion, as their precise implementation is not material to the practice of the invention provided they implement the present invention as disclosed herein.

Each of the systems 210 and 212 comprises a server 215 networked to a plurality of workstations 216. Each has been configured virtually identically and employ identical file structures. The only significant difference between the systems 210 and 212 is that a system is a member of either the production or development environment. Thus, the production system 212 uses production data, and the development system 210 uses development data. Although the systems are configured identically and are intended to operate on the same software, they actually reference different data files. Identical file structures mean, however, that the data files in the development system 210 have direct counterparts in the data files of the production system 212. The software cannot be simply transported from the development system 210 to the production system 212 because the different files have different names. To address this problem, variable symbolic links are utilized.

For instance, an earlier example included a reference to a file named RealFile.PRO. Such a file might be found on the production system 212. However, the direct counterpart on development system 210 might be named RealFile.DEV rather than RealFile.PRO. The software developed on the development system 210 would then reference the file RealFile.DEV. All such references would cause fatal errors during program execution after transporting the software from the development system 210 to the production system 212. The only solution to this problem, using conventional techniques, is to edit the software or otherwise re-code to change all references to RealFile.DEV to references to RealFile.PRO. However, the edited software could not then be tested on the development system 210 for errors; all such errors would have to be detected after the transportation to the development system 212. The present invention provides a simpler, cleaner, and more effective resolution to this dilemma.

Referring now to both FIG. 1 and FIG. 2, a virtual variable $HOST$ may be defined on both the development system 210 and on the production system 212. The virtual variable $HOST$ is defined to be DEV on the development system 210 and to be PRO on the production system 212. The manner in which this variable definition is accomplished is not material to the practice of the invention and may be implementation specific. One technique may include establishing and maintaining a table in the kernel as discussed more fully below. An alternative technique would be to suitably alter existing i-node structures. In a UNIX operating system, creating such a kernel table or modifying existing i-node structures would alter what is known as the "superblock," and other superblock alterations might be employed in defining the virtual variable in various alternative embodiments. Thus, a "virtual variable" is, conceptually, like any traditional variable and, in the present context, is an alias for some system component or identifying characteristic.

In some embodiments, it will first be necessary to construct the kernel table prior to the variable definition. The kernel table is constructed at the kernel level. A kernel table for virtual variable storage can be defined and created in the illustrated embodiment with the following code:

```
#define VSL_MAX_VAR_SIZE 16 /* max size of variable name */
#define VSL_MAX_VAL_SIZE 64 /* max size of value */
#define VSL_MAX_VARIABLES 100 /* size of table */
struct vsl_table {
    char vsl_varname[VSL_MAX_VAR_SIZE];
    char vsl_value[VSL_MAX_VAL_SIZE];
vsl_data[VSL_MAX_VARIABLES];
```

This code creates a kernel table containing 100 variable/ value pairs. Note, however, that in embodiments where a suitable kernel table has already been constructed or is otherwise available, this step is unnecessary.

The variable definitions themselves may come from a number of sources depending on the particular implementation. For example, a set of default variables can be made available by the system. These might include $HOSTNAME$, $DOMAIN$, $NETWORK$, $CLASS$ or others. These are defined and maintained by the system in a kernel table.

In the particular embodiment under discussion, variables can be added to this table at the user level using a new command named addvlink. The syntax for the addvlink command is:

addvlink $VARIABLE$ VALUE where $VARIABLE$ is the name of the variable to be added and VALUE is what the variable should expand to. By default, the variable tables in this embodiment are modifiable only by the root user. However extensions to the addvlink command could provide for user defined tables or to allow members of privileged groups to modify these tables in alternative embodiments.

The variables defined using the addvlink user command are, in this embodiment, then added to the kernel table at the kernel level. For instance, to add a variable definition, a system call can be written such as:

int vsl_add(char *variable_name, char *value);

The variable name string and the value string are passed as parameters to this call. The call then searches the VSL table to see if the variable_name already exists. If the variable_ name does not exist, the entry is added to the table. If the variable_name does exist, an integer error code is returned and the data is not added to the table. If the table is out of space, an integer error code is returned.

Generally speaking, variable addition is but one of several functions that may be desirable in maintaining the kernel table once it is created. Such maintenance functions are performed through system calls generated by user commands, such as addvlink, and to which the kernel responds. Other maintenance functions include changing variable definitions, deleting variable definitions, and listing kernel table entries, although this list is far from exhaustive.

These additional maintenance functions can be performed by system calls similar to those for adding definitions. For example, a variable definition may be changed by a systems call such as:

int vsl_modify(char *variable_name, char *value),

The variable name string and the value string are passed as parameters to this call. The call then searches the VSL table to see if the variable_name already exists. If the variable_ name does not exist, the entry is added to the table. If the variable_name does exist, the new value is added to the table. If the table is out of space, an integer error code is returned. A variable definition might also be deleted, with a system call such as:

int vsl_remove(char *variable_name);

The variable name string is passed as a parameter to this call. The call then searches the kernel table to see if the variable_ name already exists. If the variable_name is found in the table, it is removed. If the variable_name is not found, an integer code is returned to reflect that result.

Returning now to the embodiment of FIGS. 1 and 2, two variables are defined in the kernel table in the particular embodiment under discussion. The command:

addvlink $HOST$ PRO is used to define the variable on all production systems, such as the production system 212. The command:

addvlink $HOST$ DEV is used to define the variable on all development systems, such as the development system 210. Thereafter, when the variable symbolic link named Data.$HOST$ is accessed on any production system, the actual file accessed is Data.PRO. If this same variable symbolic link file were accessed in development, the actual data file used would be Data.DEV.

Once the virtual variable is defined, as set forth in the box 120, a variable symbolic link referencing a file using the virtual variable is created. This discussion will assume that the program is under development on the development system 210 in accord with this particular embodiment. Thus, a variable symbolic link is created on the development system 210, e.g., a variable symbolic link named RealFile.$HOST$. This variable symbolic link is a file in the same way a symbolic link is a file, i.e., it is a pointer. The difference, however, is that the virtual variable HOST is expanded as set forth below to complete the identity of the file to which the variable symbolic link points.

In order to create the variable symbolic link, as set forth in the box 120, the particular embodiment illustrated alters the UNIX ln command that creates links. More particularly, the ln command might be altered to include a −v option creating a variable symbolic link. Then the ln command can be used to create the virtual symbolic link in our example by executing the command ln−v Realfile $HOST$ This command would then create a variable symbolic link file named RealFile.$HOST$.

When the file (i.e., the variable symbolic link RealFile.$HOST$) is created as a variable symbolic link, the UNIX operating system marks the file as such. The UNIX operating systems does this by marking the mode field of the directory entry in the same manner it would mark the mode field for a hard link or a symbolic link. When the UNIX operating system detects that the file is a variable symbolic link, it treats the file name component between the "$" tags as the variable to be expanded. In this example, $HOST$ would expand to the name of the system (e.g., DEV), and the link would then point to the real file named RealFile.DEV. One limitation to this particular embodiment is that the first component of the variable symbolic link name (e.g., RealFile) must match the first component of the real file name.

Next, as set forth in the box 130, a file is referenced using the virtual variable. Such a reference typically occurs in the execution of an applications program or otherwise upon the direction of a user. For instance, a program or a user might issue a command to open or rewind the file RealFile.$HOST$. The UNIX operating system, when implementing the invention, recognizes this file as a variable symbolic link and expands the virtual variable HOST to determine the actual identity of the file being referenced. In the current example, the UNIX operating system determines that the virtual variable has been defined as DEV and then executes the command using the file RealFile.DEV.

Executing a command referencing a variable symbolic link may be conceptually separated into three parts. First, the kernel must recognize the variable symbolic link as such. Second, the kernel must extract the actual value for the specified variable from the kernel table. And, third, the kernel must perform the operation using the actual value for the specified variable.

More particularly, once a variable symbolic link is referenced, the reference is communicated to the kernel. When the open( ) call is performed, the type of the referenced file is determined. For example, in conventional UNIX operating systems, the kernel determines if the file is a pipe, a socket, a directory, a flat file, or perhaps a symbolic link. An additional test for a variable symbolic link would be added to this code. Once the kernel determines that the file is a variable symbolic link, the variable portion of the name is extracted, and a call to the *vsl_getvalue( ) call is made. The value returned is the name of the file resulting from expanding the variable name into a real value. Once the value has been extracted from the kernel table, the resulting file name is then treated as a normal symbolic link.

When an applications program tested on the development system 210 is transported to the production system 212, as indicated by the arrow 218, the virtual variable $HOST$ has been defined on the production system 212 as PRO. Thus, when the applications program references a file by the virtual variable, e.g., RealFile.$HOST$, the UNIX operating system expands the virtual variable to determine the new file being referenced, e.g., RealFile.PRO rather than the file that was referenced during the applications program's development. Furthermore, this difference occurs without modification to the applications program.

Figure 3:
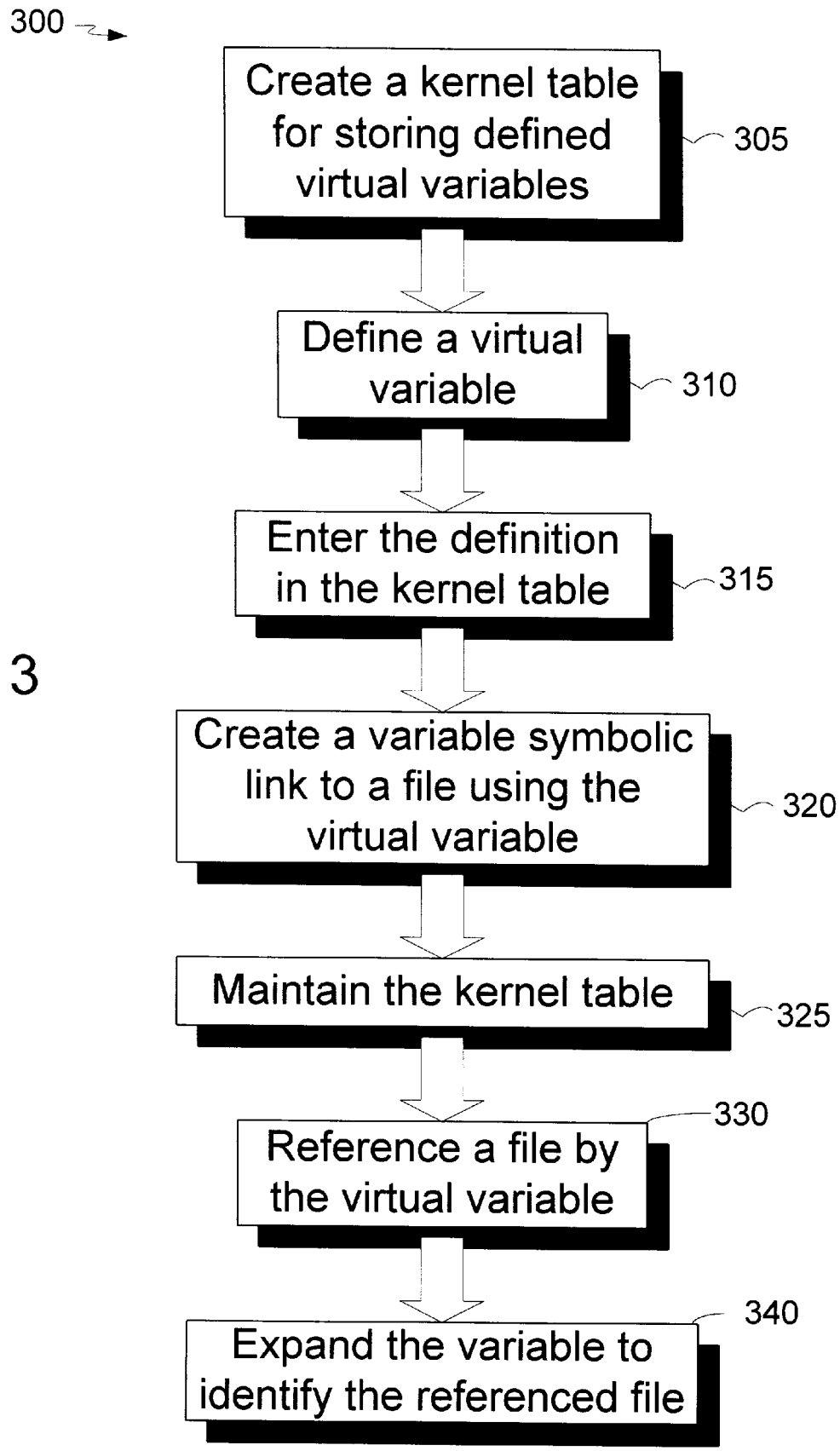
FIG. 3 summarizes one particular embodiment of the method in FIG. 1.

FIG. 3 summarizes the particular embodiment of FIG. 1 discussed above relative to the implementation 200 of FIG. 2. The method 300 is, like the method 100 of FIG. 1, a method for linking to a file in a UNIX operating system. The method comprises first creating a kernel table for storing defined virtual variables as set forth in the box 305. Next, the method 300 defines a virtual variable as shown in the box 310. Defining the virtual variable includes, as set forth in the box 315, entering it into the kernel table earlier created, see the box 305, and is a form of kernel table maintenance, see box 325. The method 300 then proceeds by creating a variable symbolic link referencing a file using the virtual variable, as set forth in the box 320.

Still referring to FIG. 3, the method 300 continues by referencing the file by the virtual variable, as set forth in the box 330. The virtual variable in the reference is expanded, as set forth in box 340. The particular implementation depicted in FIG. 3 expands the variable by recognizing the referenced file as a variable symbolic link, ascertaining the value for the virtual variable, and executing a command referencing the variable symbolic link.

The method 300, as illustrated in FIG. 3, indicates that the maintenance of the kernel table, see box 325, is performed between the creation of the variable symbolic link and referencing the file by the virtual variable. As indicated in the discussion above, however, performance of kernel table maintenance is not so limited. Kernel table maintenance will typically be performed throughout the execution of the method 300 as needed by system operation.

Thus, variable symbolic links may generally be considered an extension to the existing symbolic link currently available in the UNIX operating system. However, unlike symbolic links, variable symbolic links reference files such that a portion of the file's name is treated as a variable. Once the file name is referenced, the UNIX kernel expands the variable portion of the file name to create the real file name. At that point the file may be treated exactly as a symbolic link. Note that there can be numerous methods to expand the variable part of the variable symbolic link name in numerous alternative embodiments. It is to be understood that the variable expansion in this particular embodiment is performed in the UNIX kernel. Therefore it does not have access to a user's personal environment space or typical UNIX commands.

Figure 4:
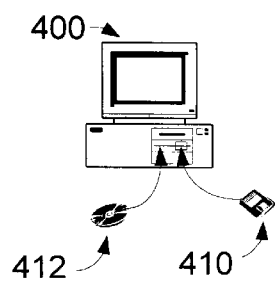
FIG. 4 illustrates a computer with which the method of FIG. 1 may be employed in embodiment alternative to that of FIG. 2.

Note, however, that the invention may be employed on a single computer system, or even a single computer. For instance, the computer 400 of FIG. 4, is such a computer. The computer 400 might be any type of computer capable of running a UNIX operating system. The particular embodiment of the computer 400 shown is a desktop personal computer, although it may, in alternative embodiments, be a palmtop, laptop, mini-mainframe, or a mainframe computer. Thus, the invention, in a second aspect, is an apparatus operated in accordance with the method of FIG. 1.

The method 100 of FIG. 1 is typically implemented as a plurality of instructions encoded on a computer-readable, program storage device, with or from which an apparatus, such as those in FIGS. 2–3, may be programmed. Exemplary of such devices are the floppy disk 410 and the optical disk 412 in FIG. 4 and magnetic tapes (not shown). However, the invention is not limited to magnetic or optical program storage devices and may be, e.g., a paper tape. The program storage device will more typically have a larger capacity and may be magnetic, such as the hard disk of the computer 400 (not shown). The precise nature of the program storage device is not material to the practice of the invention. Thus, the invention, in a third aspect, is a computer-readable, program storage device encoded with instructions for performing the method of FIG. 1.

Returning to the example in the background discussion, consider the following output using the ls–li command after employing the method 100 in FIG. 1 on the implementation 200 in FIG. 2. The ls command is used to list the contents of a directory. The –l and –i options output a 'long' listing including the i-node number for the file. Executing the command on the production system 212 yields the following output:

| 1872396 | -rwxr-xr-x | 2 user | nuucp | 436 | Oct 20 13:43 | HardLink |
| 1872396 | -rw-r-xr-x | 2 user | nuucp | 436 | Oct 20 13:42 | RealFile.PRO |
| 1872397 | lrwxr-xr-x | 1 user | nuucp | 15 | Oct 20 13:43 | SymbolicLink@ –>RealFile.PRO |
| 187239 | vrwxr-xr- | 1 user | nuucp | 27 | Oct 20 13:43 | RealFile.$HOST$ –>Realfile.PRO |

Executing the command on the development system 210 yields the following output:

| 1872396 | -rwxr-xr-x | 2 user | nuucp | 436 | Oct 20 13:43 | HardLink |
| 1872396 | -rw-r-xr-x | 2 user | nuucp | 436 | Oct 20 13:42 | RealFile.DEV |
| 1872397 | lrwxr-xr-x | 1 user | nuucp | 15 | Oct 20 13:43 | SymbolicLink@ –>RealFile.DEV |
| 187239 | vrwxr-xr- | 1 user | nuucp | 27 | Oct 20 13:43 | RealFile.$HOST$ –>Realfile.DEV |

Still building on the earlier example, the files named RealFile.PRO and RealFile.DEV are standard UNIX files that a user created using a text editor and are direct counterparts in their respective computer systems. The file named HardLink was created as a hard link to the file RealFile.PRO, as indicated by the i-node number, which is the same for both files in the respective outputs. Column 3, which is the link count, is 2, indicating there are two files in each file system referencing the same i-node number. The file named SymbolicLink is a symbolic link to the file named RealFile.PRO and RealFile.DEV in the respective computer systems. Notice that the first letter in the second column of each output is an '1', which stands for link. Notice also that column six of each output is the file size which in this case is 15 bytes. If one were able to look at the real contents of this file, it would be RealFile.PRO. However since the kernel knows this is a symbolic link, it treats the contents of the file as the name of the 'real' file to access. The name of the link and the name of the real file can be entirely different. The fourth entry is the proposed entry for a variable symbolic link. Note that the first letter in the second column is a "v", which designates the file as a variable symbolic link.

There are numerous practical applications for variable symbolic links, particularly in locations where there are large numbers of systems to be maintained. Those skilled in the art having the benefit of this disclosure will appreciate that some modification to conventional UNIX operating systems will be desirable in order to implement the present invention. The type and number of changes will be highly implementation dependent. None of these modifications will be unduly burdensome to those ordinarily skilled in the art provided they have the benefit of this disclosure. For instance, one technique mentioned for defining a virtual variable would be to modify existing i-node structures. Those modifications would include altering i-node tables and directory entry tables. These alterations would be readily apparent to those skilled in the art having the benefit of this disclosure.

The particular embodiments disclosed above are illustrative only, as the invention may be modified and practiced in different but equivalent manners apparent to those skilled in the art having the benefit of the teachings herein. For instance, the virtual variable may be an alias for an entire file name rather than just an extension. Using earlier examples, the virtual variable $HOST$ might be defined as RealFile.DEV or RealFile.PRO rather than just DEV or PRO. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for linking to a file in a UNIX operating system, the method comprising:

defining a virtual variable;

creating a variable symbolic link to a file using the virtual variable;

referencing the file by the virtual variable; and expanding the virtual variable to identify the referenced file.

2. The method of claim 1, further comprising creating a kernel table used to expand the virtual variable.

3. The method of claim 2, wherein defining the virtual variable includes entering the virtual variable in the kernel table.

4. The method of claim 1, wherein defining a virtual variable includes altering an existing i-node structure.

5. The method of claim 1, wherein defining the virtual variable includes altering a superblock.

6. The method of claim 1, further comprising at least one of changing the definition of the variable and deleting the virtual variable definition after the virtual variable is expanded to identify the referenced file.

7. The method of claim 1, wherein defining the virtual variable includes defining the virtual variable as a first value on a first computer system and as a second value on a second computer system.

8. The method of claim 1, wherein creating a variable symbolic link includes marking a mode field for the file to identify the file as a variable symbolic link.

9. The method of claim 1, wherein expanding the virtual variable includes:

recognizing the referenced file as a variable symbolic link;

ascertaining the value for the virtual variable in the variable symbolic link; and executing a command referencing the variable symbolic link using the ascertained value.

10. The method of claim 9, wherein ascertaining the value for the virtual variable includes extracting the value from a kernel table.

11. A computer-readable, program storage device encoded with instructions that, when executed by a computer, perform the following method in a UNIX operating system:

defining a virtual variable;

creating a variable symbolic link to a file using the virtual variable;

referencing a file by the virtual variable; and expanding the variable to identify the referenced file.

12. The program storage device of claim 11, wherein the encoded method further comprises creating a kernel table used to expand the virtual variable.

13. The program storage device of claim 12, wherein defining the virtual variable in the encoded method includes entering the virtual variable in the kernel table.

14. The program storage device of claim 11, wherein defining the virtual variable in the encoded method includes altering an existing i-node structure.

15. The program storage device of claim 11, wherein defining the virtual variable in the encoded method includes altering a superblock.

16. The program storage device of claim 11, wherein the encoded method further comprises at least one of changing the definition of the variable and deleting the virtual variable definition after the virtual variable is expanded to identify the referenced file.

17. The program storage device of claim 11, wherein defining the virtual variable in the encoded method includes defining the virtual variable as a first value on a first computer system and as a second value on a second computer system.

18. The program storage device of claim 11, wherein creating a variable symbolic link in the encoded method includes marking a mode field for the file to identify the file as a variable symbolic link.

19. The program storage device of claim 11, wherein expanding the virtual variable in the encoded method includes:
   recognizing the referenced file as a variable symbolic link;
   ascertaining the value for the virtual variable in the variable symbolic link; and
   execute a command referencing the variable symbolic link using the ascertained value.

20. The program storage device of claim 19, wherein ascertaining the value for the virtual variable in the encoded method includes extracting the value from a kernel table.

21. The program storage device of claim 11, wherein the program storage device is selected from the group comprising a magnetic storage device, an optical storage device, and a paper storage device.

22. An apparatus, comprising a computer programmed to perform the following method:
   defining a virtual variable;
   creating a variable symbolic link to a file using the virtual variable;
   referencing a file by the virtual variable; and
   expanding the variable to identify the referenced file.

23. The apparatus of claim 22, wherein the programmed method further comprises creating a kernel table used to expand the virtual variable.

24. The apparatus of claim 23, wherein defining the virtual variable in the programmed method includes entering the virtual variable in the kernel table.

25. The apparatus of claim 22, wherein defining the virtual variable in the programmed method includes altering an existing i-node structure.

26. The apparatus of claim 22, wherein defining the virtual variable in the programmed method includes altering a superblock.

27. The apparatus of claim 22, wherein the programmed method further comprising at least one of changing the definition of the variable and deleting the virtual variable definition after the virtual variable is expanded to identify the referenced file.

28. The apparatus of claim 22, wherein defining the virtual variable includes defining the virtual variable as a first value on a first computer system and as a second value on a second computer system.

29. The apparatus of claim 22, wherein creating a variable symbolic link includes marking a mode field for the file to identify the file as a variable symbolic link.

30. The apparatus of claim 22, wherein expanding the virtual variable includes:
   recognizing the referenced file as a variable symbolic link;
   ascertaining the value for the virtual variable; and
   execute a command referencing the variable symbolic link.

31. The apparatus of claim 30, wherein ascertaining the value for the virtual variable in the programmed method includes extracting the value from a kernel table.

32. A method for linking to a file in an operating system, the method comprising:
   creating a kernel table for storing defined virtual variables;
   defining a virtual variable;
   entering a definition of the virtual variable in the kernel table;
   creating a variable symbolic link to a file using the virtual variable, including marking a mode field for the file to identify the file as a variable symbolic link;
   maintaining the kernel table, including a least one of adding definitions, changing definitions, and deleting definitions after the virtual variable is expanded to identify the referenced file;
   referencing a file by the virtual variable; and
   expanding the virtual variable to identify the referenced file, including:
      recognizing the referenced file as a variable symbolic link;
      ascertaining the value for the virtual variable in the variable symbolic link; and
      executing a command referencing the variable symbolic link using the ascertained value.

33. The method of claim 32, wherein defining the virtual variable includes defining the virtual variable as a first value on a first computer system and as a second value on a second computer system.

* * * * *